United States Patent [19]

Reetz et al.

[11] Patent Number: 5,494,983
[45] Date of Patent: Feb. 27, 1996

[54] METHOD FOR ANIONIC POLYMERIZATION OF ACRYLIC AND METHACRYLIC ACID DERIVATIVES AND ACRYLONITRILE METHACRYLONITRILE USING RESONANCE STABILIZED ANIONS

[75] Inventors: Manfred T. Reetz, Wiesentalweg 14, 3550 Marburg, Germany; Thomas Knauf, Sarnia, Canada

[73] Assignee: Manfred T. Reetz, Muelheim/Ruhr, Germany

[21] Appl. No.: 737,307

[22] Filed: Jul. 31, 1991

[30] Foreign Application Priority Data

Aug. 1, 1990 [DE] Germany ............. 40 24 454.7

[51] Int. Cl.⁶ ................................. C08F 2/06
[52] U.S. Cl. ............. 526/194; 526/204; 526/217; 526/310
[58] Field of Search ................. 526/194, 204, 526/217, 128, 310

[56] References Cited

U.S. PATENT DOCUMENTS

| 3,451,977 | 6/1969 | Hoyt ........................... 526/236 |
| 3,631,009 | 12/1971 | Meyer ......................... 526/236 |
| 4,351,924 | 9/1982 | Andrews et al. . |
| 4,414,372 | 11/1983 | Farnham et al. . |
| 4,417,034 | 11/1983 | Webster . |

FOREIGN PATENT DOCUMENTS

| 0145263 | 6/1985 | European Pat. Off. . |
| 0145283 | 6/1985 | European Pat. Off. . |
| 0306714 | 3/1989 | European Pat. Off. . |
| 3727528 | 3/1989 | Germany . |
| 64-69605 | 3/1989 | Japan . |

OTHER PUBLICATIONS

Angewandte Chemie, Reetz and Piejko, VCH Verlagsgesellschaft mbH, D–6940 Weinheim, 1986.
Macromolecules 17 (1984) pp. 1415–1417.
Angew. Chem. 100 (1988) pp. 1026–1030.
Angew. Chem. vol. 25, No. 12, Dec. 1986, pp. 1108–1109.
Angew. Chem. vol. 27, No. 10, Oct. 1988, pp. 1373–1374.

*Primary Examiner*—Christopher Henderson
*Attorney, Agent, or Firm*—Sixbey, Friedman, Leedom & Ferguson

[57] ABSTRACT

A process for anionic polymerization of acrylic and/or methacrylic acid derivatives or their ammonium salts with easily produced initiators. Specifically, the initiators are ammonium salts of resonance-stabilized nitrogen anions. The introduction of such initiators provides a maximum amount of structural variation, while inducing the controlled anionic polymerization of monomers at room temperature. The anionic polymerization is also applicable to acrylonitrile or methacrylonitrile or their derivatives. The polymerization process of the present invention provides polymers with definite molecular weight and limited molecular weight distribution.

5 Claims, No Drawings

METHOD FOR ANIONIC POLYMERIZATION OF ACRYLIC AND METHACRYLIC ACID DERIVATIVES AND ACRYLONITRILE METHACRYLONITRILE USING RESONANCE STABILIZED ANIONS

BACKGROUND OF THE INVENTION

1. Field of the Invention

The invention relates to processes for anionic polymerization of acrylic and/or methacrylic acid derivatives or their ammonium salts and/or acrylonitrile or methacrylonitrile or their derivatives.

2. Description of the Related Art

The anionic polymerization of vinyl monomers has the advantage, relative to the process for radical polymerization, that polymers with a much more limited molecular weight distribution are obtainable and that block polymerizations can be performed in a comparatively simple way (see, e.g., U.S. Pat. Nos. 4,351,924, 4,414,372, EP-A-0 145 263, Macromonomers 17 (1984) pages 1415–1417and Angew. Chem. [Appl. Chem.] 100 (1988) pages 1026–1030).

While monomers such as styrene enter into quite smooth anionic polymerizations, difficulties arise with monomers such as acrylates and methacrylates, since the increasing or anionic chain ends can enter into undesired secondary reactions, such as intramolecular Claisen reactions, which results in stopping the polymerization. Therefore, low temperature (e.g., −30° to −78° C.) are necessary and the reaction must include organo-metallic initiators, which are complex and expensive.

In the case of group transfer polymerization, the reaction can be performed at room temperature with the formation of polyacrylates and polymethacrylates with limited molecular weight distribution. However, the initiators and the catalysts, which are necessary, are expensive compounds (see, e.g., U.S. Pat. No. 4,414,372, 4,417,034, EP-A-0 145 283, Macromonomers 17, (1984) 1415– 1417, Angew. Chem. [Appl. Chem.] 98 (1986) 1116–1118 and Angew. Chem. 100 (1988) 1026–1030). The use of tetraalkylammonium salts of resonance-stabilized carbanions as initiators has the advantage of producing polyacrylates and polymethacrylates with limited molecular weight distribution can be produced at room temperature without catalysts. (Angew. Chem. 100 (1988) 1422–1423, West Germany Laid Open No. 3727528, Europe Laid Open No. 306714, Japan Laid Open No. 1069605). But the number of easily accessible carbanions of this type is limited. It is, also, difficult, if not impossible, to incorporate certain functionalities, such as heterocycles or amino groups, in the initiator. This is important also with respect to the production of polymers with reactive or potentially reactive functional groups on a chain end.

Therefore, a process is needed for anionic polymerization of acrylic and/or methacrylic acid derivatives or their ammonium salts which is simple and inexpensive to use.

SUMMARY OF THE INVENTION

An object of the present invention is to overcome the deficiencies of the prior art and specifically, to make available a process for anionic polymerization of acrylic and/or methacrylic acid derivatives or their ammonium salts and/or acrylonitrile or methacrylonitrile or their derivatives.

Another object of the present invention is to find a new class of technically easily available initiators, which make possible a maximum amount of structural variation and at the same time induce the controlled anionic polymerization of said monomers at room temperature with the formation of polymers with defined molecular weight and limited molecular weight distribution.

The foregoing objects are achieved by a process for anionic polymerization of acrylic and/or methacrylic acid derivatives or their ammonium salts which occurs at room temperature without the need for expensive catalysts. Specifically, the process of the present invention includes the introduction of ammonium salts of resonance-stabilized nitrogen anions as polymerization initiators. The introduction of these salts as initiators allows the polymerization of the above-identified compounds at room temperature to produce a polymer with defined molecular weights and a limited molecular weight distribution. This is important for the production of polymers with reactive or potentially reactive functional groups on a chain end.

DETAILED DESCRIPTION OF THE PREFERRED EMBODIMENTS

It was found that the easily accessible ammonium salts of resonance-stabilized nitrogen anions are very well-suited as initiators for the anionic polymerization of acrylic and methacrylic acid derivatives. Since quite a lot and very different substituents of nitrogen result in a resonance stabilization of the corresponding anions (see, e.g., S. Hauptmann, Organische Chemie [Organic Chemistry], Verlag Harri Deutsch, Thun, Frankfurt/M, 1985, pages 422, 466, 488–491, 607), an abundance of standard, easily accessible and inexpensive neutral precursors is available to the chemist for the synthesis of nitrogen anions. For example, not only single and double acylated amines are suitable, but also sulfonylated amines, as well as heterocycles, such as indoles and carbazoles. Surprisingly, the corresponding ammonium salts induce the anionic polymerization of said monomers with the formation of polymers with limited molecular weight distribution at room temperature without using catalysts. The polymers all have an end group containing nitrogen, which can have a varied structure depending on the nature of the selected initiator.

The initiating action of the ammonium salts of the nitrogen anions is therefore also surprising, since the analogous alkali salts of the resonance-stabilized nitrogen anions release unsatisfactory polymerization reactions to produce undesirable polymer products, i.e., polymers with low yields and broad molecular weight distributions. Thus, e.g., the polymerization of acrylic acid-n-butyl ester takes place with the sodium salt of carbazole to 49% with the formation of a polybutylacrylate with broad molecular weight distribution. The invention therefore includes a process for metal-free anionic polymerization of said monomers, in which the polymerization is triggered by ammonium salts of nitrogen anions and is performed at temperatures from −15° to +75° C. The process may optionally be held in an aprotic solvent.

Preferably, the ammonium salts of resonance-stabilized nitrogen anions to be used as initiators can be described by the general formula:

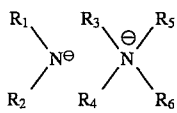

in which

R₁ stands for an electronegative group,

R₂ stands for an electronegative group or an alkyl, aryl or trialkylsilyl group, or in which R₁ and R₂ form a heterocycle.

Examples of electronegative groups, are as follows: —C(O)OR, —C(O)R, —C(O)H, —C(O)N(R)₂, —C(O)SR, —CN, —SO₂R, —NO₂ and —P(O)(OR)₂, wherein R is alkyl or aryl, preferably $C_1$–$C_6$ alkyl or phenyl.

The heterocycles consisting of R₁ and R₂ are, for example, the unsubstituted (or optionally substituted) representatives below:

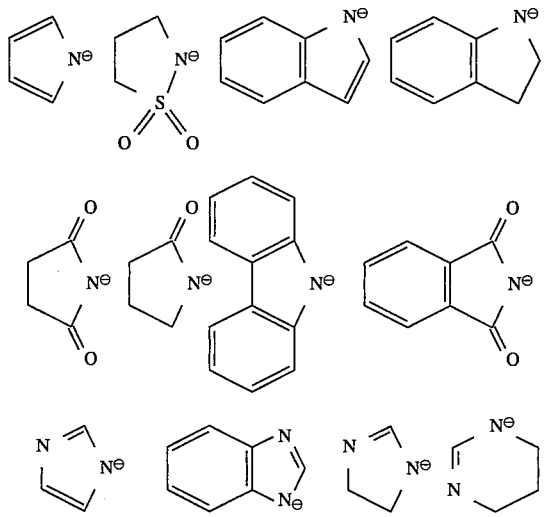

The ammonium salts of the above-named anions each with one or more radicals, e.g., alkyl, phenyl, vinyl, halogen, nitro or cyano, which can be bound to the various C atoms of the skeletons, are regarded as substituted representatives. In neutral form (i.e., as NH compounds or precursors), those heterocycles with the most varied substituents and substitution patterns are present in large number (see, e.g., G. R. Newkome, W. W. Pandler, Contemporary Heterocyclic Chemistry, John Wiley, New York, 1982).

The preferred ammonium ions contain radicals R₃, R₄, R₅ and R₆, which respectively mean alkyl, cycloalkyl, aralkyl or aryl, or two adjacent radicals R₃, R₄, R₅ and R₆ together with the nitrogen and optionally other heteroatoms form a heterocycle, and the total of the C atoms contained altogether in radicals R₃, R₄, R₅ and R₆ is less than 50, preferably less than 30.

For R₃, R₄, R₅ and R₇, respectively, the following are suitable examples thereof: as alkyl radicals, in particular $C_1$–$C_{18}$ alkyl radicals, methyl, ethyl, propyl, n-butyl, hexyl, heptyl, dodecyl and octadecyl radical; as cycloalkyl radicals, cyclopentyl and cyclohexyl radicals optionally substituted by $C_1$–$C_4$ alkyl radicals; as aralkyl radicals, benzyl radicals optionally substituted by $C_1$–$C_4$ alkyl radicals or methoxy groups; as aryl radicals, phenyl radicals optionally substituted by $C_1$–$C_4$ alkyl radicals. As examples for heterocycles, which can be formed by two adjacent radicals R₃, R₄, R₅ or R₆ together with the nitrogen and optionally other heteroatoms, above all 5- or 6-membered heterocycles, such as the pyrrolidine, piperidine or morpholine rings, are suitable. Also, chiral ammonium salts, e.g., derivatives derived from easily accessible alkaloids (e.g., from (−)-cinchonidine, cf. Merck Index 10, p. 2262) can be used as counterions.

The ammonium salts of the nitrogen anions can be easily produced in two ways: either by direct reaction of the NH acidic precursor with the hydroxide of an ammonium ion, e.g., with HO⁻N⁺(n-Bu)₄ (method 1) or by reaction of sodium or potassium salt of the NH compound with an ammonium halide (e.g., Cl⁻N⁺(n-Bu)₄):

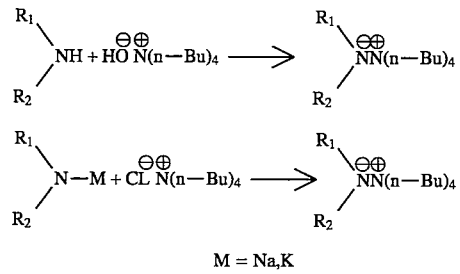

M = Na,K

The sodium or potassium salts of NH-acidic compounds are generally known and can be easily produced, e.g., by reaction of the NH-acidic compounds with sodium hydride or potassium hydride.

The polymerization according to the invention can be performed at temperatures of −15° to +75° C., preferably temperatures of 20° to 50° C. are selected.

The nitrogen anions to be used according to the invention are used as initiators in such an amount that the monomer/initiator molar ratio is at least 2:1, preferably 5:1 to 1,000:1. As is generally the practice for anionic polymerizations, the polymerization according to the invention is performed with the ammonium salts of nitrogen anions in an inert gas atmosphere, e.g., nitrogen or argon, and with exclusion of moisture.

The process for polymerization according to the invention is preferably performed in an aprotic solvent, e.g., diethyl ether, tetrahydrofuran, ethyl acetate, acetonitrile, dimethylformamide, N-methylpyrrolidinone, 1,3-dimethyl-3,4,5,6-tetrahydro- 2(1H)-pyrimidinone, or tetraethylsulfamido, also toluene, as well as mixtures of the above-named solvents. Preferably, tetrahydrofuran is selected. The monomer content of the polymerization solutions is preferably 5 to 50% by weight. The following are representatives of usable monomers, e.g., acrylates, such as methyl acrylate, ethyl acrylate, 2,2,2-trifluoroethyl acrylate, n-butyl acrylate, allyl acrylate, 2-ethylhexyl acrylate, 2-(dimethylaminoethyl)acrylate, benzyl acrylate, as well as 4'-(6-propenoyloxyhexoxy)benzoic acid- 4-methoxyphenyl ester; methacrylates, such as methyl, ethyl, n-propyl, n-butyl and isopropyl methacrylate; also nitriles, such as acrylonitrile, methacrylonitrile, alpha-chloroacrylonitrile and 1,1-dicyanoethylene, are suitable.

The process, according to the invention, for anionic polymerization of said monomers is preferably performed as follows:

The ammonium salt, being used as an initiator, of a resonance-stabilized nitrogen anion is introduced in a solvent as a solution or suspension at room temperature. With vigorous stirring, the monomer, i.e., a acrylic or methacrylic acid derivative, is added to it in a pure state or as a solution with the possibility of completely or partially dissipating the reaction heat. As a rule, polymerizations are exothermic and the temperature can increase up to 50° C. If this temperature is exceeded, cooling is performed. After the end of the polymerization, the mixtures are worked up in the usual way, i.e. reacted with HCl/H$_2$O or alkyl halides, or else converted, by adding chlorotrimethylsilane, to active, storable polyacrylic or polymethacrylic acid derivatives which exhibit O-trimethylsilyl-ketone ketal end groups. Primary alkyl halides, such as methyl, allyl or optionally substituted benzyl chlorides, bromides or iodides are used as alkyl halides.

The production of the initiators according to the invention takes place either with method 1 or method 2, and as a rule, almost equal quantitative yields are achieved.

Method 1

2 ml (2 mmol) of tetrabutylammonium hydroxide (1M solution in methanol) is introduced in a heated argon- or nitrogen-filled 100 ml nitrogen flask, which is provided with a magnetic stirring rod. After 2 mmol of the N—H acidic component is added, it is stirred for 30 minutes at room temperature. Then, the methanol is drawn off in an oil pump vacuum and dried on P$_4$O$_{10}$ for 5–18 hours in the oil pump vacuum. As a rule, white solids, in some cases, yellowish oils, are obtained. The products are variably stable depending on N—H acidity, and can generally be stored for weeks under argon or nitrogen. The production on an enlarged scale takes place analogously.

Method 2

0.300 g (10 mmol) of NaH (80% suspension in paraffin) is introduced in 20 ml of THF in a 100 ml nitrogen flask equipped with a magnetic stirring rod. 10 mmol of the N—H acidic substance is added in an argon or nitrogen counterstream or by a septum. A sodium-nitrogen anion solution is formed with vigorous hydrogen formation and heating. (In cases in which the anion is not soluble, this reaction takes place slowly at 22° C., in which case method 1 is preferred.) The anion solution is transferred to a second nitrogen flask, in which 3.0 g (greater than 10 mmol) of tetrabutylammonium chloride is introduced. NaCl precipitates with stirring, and the ammonium chloride dissolves. The sodium chloride is separated with a reversing frit under argon or nitrogen, which divides the initiator into equivalent portions for later polymerization. The production on an enlarged scale takes place analogously. If the solvent is to be changed, the THF is drawn off (1–2 hours) at 22° C. in an oil pump vacuum, and the thus obtained white to yellowish finely powdered product is taken up in the solvent and then is divided for the polymerizations.

The following initiators are typical examples:

Initiator 1 (tetrabutylammonium-N-methyltoluenesulfamido): according to method 1, starting from N-methyltoluenesulfamide, a white solid is obtained.

Initiator 2 (tetrabutylammonium-butyrolactam): according to method 1, starting from butylolactam, a yellowish oil is obtained.

Initiator 3 (tetrabutylammonium-N-methylacetamide) according to method 1 (starting from N-methylacetamide), a yellowish, partially crystalline oil is obtained.

Initiator 4 (tetrabutylammonium-N-methylformamide): according to method 1 (starting from N-methylformamide), a yellowish oil is obtained.

Initiator 5 (tetrabutylammonium-carbazolide): according to method 1 or 2 (starting from carbazole), a bright yellow powder is obtained with the following $^{13}$C-NMR-spectroscopic data (in C$_6$D$_6$): delta=13.9, 19.7, 23.6, 30.2, 57.3, 113.0, 116.2, 119.7, 122.6, 125.1, 152.8 ppm.

Initiator 6 (tetrabutylammonium-phthalimide): according to method 1, starting from phthalimide, a finely crystalline powder is obtained. $^{13}$C-NMR (C$_5$D$_5$N): 13.8, 20.1, 24.3, 58.9, 120.1, 130.3, 141.5, 186.9 ppm.

Initiator 7 (tetrabutylammonium-succinimide): according to method 1 or 2, starting from succinimide, a finely crystalline powder is obtained: $^{13}$C-NMR (C$_5$D$_5$N): 13.8, 20.1, 24.3, 34.0, 58.9, 196.1 ppm.

The following examples are provided to illustrate the advantages of the process of the present invention.

EXAMPLE 1

In a 100 ml flask aerated with nitrogen or argon, acrylic acid-n-butyl ester (3.85 g, 10 mmol) is instilled with stirring (instillation rate about 0.5 to 1 ml/min.) at room temperature in the mixture of 3 mmol of initiator 1 (tetrabutylammonium-N-methyltoluenesulfamide) in about 30 ml of dry tetrahydrofuran. The temperature of the mixture increases to about 40° C. The mixture is stirred for 2 more hours and then introduced in 50 ml of 2N hydrochloric acid covered with a layer of diethyl ether. It is shaken out once with 120 ml of ether and the combined organic phases are washed twice with a little water, once with NaHCO$_3$ solution and once with saturated NaCl solution. The ether phase is dried on MgSO$_4$ and the solvent is distilled off first in a rotary evaporator and then drawn off for 3 hours at 50° C. in an oil pump vacuum. The solid polybutyl acrylate (4.1 g, 92% yield) is characterized with the gel permeation chromatography by using polybutyl acrylate-calibrated test pieces, and M$_w$ represents the weight average value of the molecular weight and M$_n$ represents the numerical average value of the molecular weight and the ratio M$_w$/M$_n$ or the molecular weight distribution mirrors the D value: M$_n$=1.82 kg/mol; M$_w$ =2.04 kg/mol; M$_n$ (theoretical)=1.47 kg/mol; D= 1.10.

EXAMPLE 2

As described in example 1, 3 mmol of initiator 1 is reacted with 7.70 g (60 mmol) of acrylic acid-n-butyl ester. 7.85 g (92%) of polybutyl acrylate is obtained; M$_n$=2.45 kg/mol; M$_w$=2.82 kg/mol; M$_n$ (theoretical)=2.75 kg/mol; D=1.15.

EXAMPLE 3

Analogous to the instructions in example 1, 3 mmol of initiator 2 (tetrabutylammonium-butyrolactam) is introduced in THF and 3.85 (30 mmol) of acrylic acid-n-butyl ester is instilled. After the usual working up, 3.7 g (90%) of polybutyl acrylate is obtained; M$_n$= 1.30 kg/mol; M$_w$=1.43 kg/mol; M$_n$ (theoretical)=1.37 kg/mol; D=1.05.

EXAMPLE 4

As described in example 3, 3 mmol of initiator 2 is reacted with 7.70 g (60 mmol) of acrylic acid-n-butyl ester. 7.27 g (92%) of polybutyl acrylate is obtained; M$_n$=1.55 kg/mol; M$_w$=1.73 kg/mol; M$_n$ (theoretical)=2.65 kg/mol; D=1.11.

EXAMPLE 5

Analogous to the instructions in example 1, 3 mmol of initiator 3 (tetrabutylammonium-N-methyl-acetamide) is introduced in THF and 7.70 g (60 mmol) of acrylic acid-n-butyl ester is instilled. After working up, 7.51 g (90%) of polybutyl acrylate is obtained; M$_n$= 1.59 kg/mol; M$_w$=1.80 kg/mol; M$_n$ (theoretical)=2.70; D=1.13.

EXAMPLE 6

Analogous to the instructions in example 1, 3 mmol of initiator 4 (tetrabutylammonium-N-methylformamide) is introduced in THF and 7.70 g (60 mmol) of acrylic acid-n-butyl ester is instilled. After working up, 7.52 (95%) of polybutyl acrylate is obtained; M$_n$=1.72 kg/mol; M$_w$=1.90kg/mol; M$_n$ (theoretical)=2.62; D= 1.10.

EXAMPLE 7

Analogous to the instructions in example 1, 3 mmol of initiator 5 (tetrabutylammonium carbazolide, produced according to method 2) is introduced in THF and 5.13 g (40 mmol) of acrylic acid-n-butyl ester is instilled. It is stirred for 3.5 hours, worked up as usual and 5.18 g (95%) of polybutyl acrylate is obtained; $M_n$=1.61 kg/mol; $M_w$=1.78; $M_n$ (theoretical)= 2.53; D=1.10.

EXAMPLE 8

As described in example 6, 3 mmol of initiator 5 is reacted with 20.5 g (160 mmol) of acrylic acid-n-butyl ester, 19.04 g (91%) of polybutyl acrylate is obtained; $M_n$=5.3 kg/mol; $M_w$=6.40 kg/mol; $M_n$ (theoretical)= 10.25; D=1.20.

EXAMPLE 9

Analogous to the instructions in example 6, 3 mmol of initiator 5, produced according to method 1, is introduced in 30 ml of dry toluene and reacted with 7.70 g (60 mmol) of acrylic acid-n-butyl ester. The temperature increases to 45°–49° C. and it is stirred for 2 more hours. After working up, 7.5 g (92%) of polybutyl acrylate is obtained; $M_n$=1.04 kg/mol; $M_w$= 1.21 kg/mol; $M_n$ (theoretical)=2.73 kg/mol; D=1.17.

EXAMPLE 10

Analogous to the instructions in example 6, 3 mmol of initiator 6 is introduced in 30 ml of dry toluene and reacted with 7.70 g (60 mmol) of acrylic acid-n-butyl ester. After working up, 7.1 g (87%) of polybutyl acrylate is obtained; $M_n$=3.16 kg/mol; $M_w$= 5.28 kg/mol; $M_n$ (theoretical)=2.75 kg/mol; D=1.67.

EXAMPLE 11

Analogous to the instructions in example 1, 2 mmol of initiator 7 (tetrabutylammonium succinimide), produced according to method 1, is introduced in 25 ml of dry tetrahydrofuran and reacted with 7.70 g (60 mmol) of acrylic acid-n-butyl ester. After working up, 7.2 g (90%) of polybutyl acrylate is obtained; $M_n$= 1.98 kg/mol; $M_w$=2.29 kg/mol; $M_n$ (theoretical)=2.60 kg/mol; D=1.16.

EXAMPLE 12

Analogous to the instructions in example 10, 1.5 mmol of initiator 7 is introduced in 25 ml of dry n-methylpyrrolidinone and reacted with 18.46 g (144 mmol) of acrylic acid-n-butyl ester, and the temperature increases to about 35° C. After working up, 16.71 g (91%) of polybutyl acrylate is obtained; $M_n$=9.73 kg/mol; $M_w$=15.85 kg/mol; $M_n$ (theoretical)=12.55; D= 1.62.

EXAMPLE 13

As described in example 11, 0.34 mol of initiator 7 is introduced in 25 ml of dry N-methylpyrrolidinone and reacted with 18.15 g (141 mmol) of acrylic acid-n-butyl ester. After the usual working up, 16.20 g (89%) of polybutyl acrylate is obtained; $M_n$=14.63 kg/mol; M=23.94 kg/mol; $M_n$ (theoretical)=54.15; D=1.64.

EXAMPLE 14

Analogous to the instructions in example 1, 3 mmol of initiator 5 is introduced in 25 ml of tetrahydrofuran and reacted with 610 mg (71 mmol) of methyl acrylate. After working up, 1.5 g (83%) of polymethyl acrylate is obtained as liquid.

EXAMPLE 15

In a 100 ml flask aerated with nitrogen or argon, the solution of 4'-(6-propenoylhexoxy)benzoic acid-4"-methoxyphenyl ester (1.4 g, 3.5 mmol) in 10 of toluene is instilled at room temperature in the solution of 213 mg (0.624 mmol) of initiator 7 (tetrabutylammonium succinimide) in 10 ml of dry toluene within 10 minutes. It is stirred for 70 more hours and worked up as usual, and 1.3 g (88%) of a polyacrylate is obtained. For further purification, the crude product is reprecipitated twice from 200 ml of ether each time at 0° C., after which 0.50 g of polymer is obtained. $M_n$=4.12 kg/mol; $M_w$=4.37 kg/mol; $M_n$ (theoretical)=2.24 kg/mol; D=1.06.

EXAMPLE 16

In a 100 ml flask aerated with nitrogen or argon, methyl methacrylate (6.0 g, 60 mmol) is instilled at room temperature in the mixture of 3 mmol of initiator 5 (tetrabutylammonium-carbazolide), produced according to method 1, in 30 ml of dry tetrahydrofuran. After a short induction period, an exothermic reaction takes place. It is cooled with a water bath so that the temperature remains at about 42°–47° C. It is stirred for 2 more hours, and then the mixture is added to semiconcentrated HCl covered with a layer of 150 ml of diethyl ether. For better solubility of the polymer, about 40 ml of dichloromethane is added to the ether. The organic phase is shaken out twice with water, once with $NaHCO_3$ solution and once with NaCl solution. After drying on $MgSO_4$, the solvent is drawn off in a rotary evaporator and the remaining solvent is drawn off at 50° C. over 5 hours in an oil pump vacuum. 6.47 g of slightly contaminated polymethyl methacrylate is obtained (about 100% yield), which is purified by precipitation from petroleum ether (40–60); $M_n$=2.91 kg/mol; $M_w$=3.41 kg/mol; $M_n$ (theoretical)=2.17 kg/mol; D=1.17.

EXAMPLE 17

Analogous to the instructions in example 15, the double amount of methyl methacrylate (12.0 g, 120 mmol) of the initiator solution is instilled. 1.35 g (about 100% crude yield) of polymethyl methacrylate, which is purified by the usual precipitation process, is obtained; $M_n$=4.76 kg/mol; $M_w$=5.26 kg/mol; $M_n$ (theoretical)=4.17; D=1.16.

EXAMPLE 18

In a 100 ml flask aerated with nitrogen, acrylonitrile (4.24 g, 80 mmol) is instilled at room temperature in the mixture of 2 mmol of initiator 5 (tetrabutylammonium carbazolide), produced according to method 2, in 30 ml of dry dimethylformamide. After the usual working up, 4.0 g (81%) of polyacrylonitrile is obtained as a bright yellow solid.

EXAMPLE 19

Comparison Example

Acrylic acid-n-butyl ester (5.13 g, 40 mmol) is instilled in 3 mmol of the sodium salt of carbazole, produced from NaH and carbazole in 25 ml of dry tetrahydrofuran. It is stirred for 4 more hours, worked up as usual and 2.5 g (49%) of polybutyl acrylate with a broad molecular weight distribution is obtained; D=3.8.

We claim:

1. A process for anionic polymerization of acrylic and methacrylic acid derivatives and ammonium salts thereof and acrylonitrile and methacrylonitrile and derivatives thereof performed at temperatures within the range of $-15°$ to $+75°$ C., wherein ammonium salts of resonance-stabilized nitrogen anions are used as polymerization initiators corresponding to formula I

 (I)

$M^+$ represents an ammonium ion corresponding to formula II

 (II)

in which $R_3$, $R_4$, $R_5$ and $R_6$, independent of one another, represent optionally substituted alkyl, cycloalkyl, aralkyl or aryl, or two adjacent radicals $R_3$, $R_4$, $R_5$ and $R_6$ together with the nitrogen atom and optionally other heteroatoms form a heterocycle, wherein the total C atoms contained in radicals R3, $R_4$, $R_5$ and $R_6$ is less than 50;

$R_1$ represents an electronegative group selected from the group consisting of —C(O)OR, —C(O)R, —C(O)H, —C(O)NR$_2$, —C(O)SR, —CN, —SO$_2$R and —NO$_2$ wherein R is an alkyl or aryl radical; and $R_2$ represents an electronegative group or an alkyl, aryl, vinyl or trialkylsilyl group, or in which $R_1$ and $R_2$ form a heterocycle.

2. A process according to claim 1, wherein radicals $R_1$ and $R_2$ form a heterocycle, which includes at least one pi-double bond.

3. A process according to claim 2, wherein said pi-double bond is selected from the group consisting of C=C, C=N and C=O.

4. A process according to claim 3, wherein the heterocycle comprises an optionally substituted pyrrole, carbazole or imidazole.

5. A process according to claim 1, wherein acrylate, methacrylate, acrylonitrile, methacrylonitrile, alpha-chloro-acrylonitrile or 1,1-dicyanoethylene are polymerized.

* * * * *